US008078177B2

(12) United States Patent
Lindoff (10) Patent No.: US 8,078,177 B2
(45) Date of Patent: *Dec. 13, 2011

(54) DERIVATION OF OPTIMAL ANTENNA WEIGHTS DURING SOFT HANDOVER

(75) Inventor: Bengt Lindoff, Bjärred (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1061 days.

This patent is subject to a terminal disclaimer.

(21) Appl. No.: 11/941,649

(22) Filed: Nov. 16, 2007

(65) Prior Publication Data

US 2008/0064408 A1 Mar. 13, 2008

Related U.S. Application Data

(63) Continuation of application No. 10/950,732, filed on Sep. 27, 2004, now Pat. No. 7,319,868.

(60) Provisional application No. 60/618,331, filed on Oct. 13, 2004.

(51) Int. Cl.
*H04B 1/38* (2006.01)

(52) U.S. Cl. .................... 455/442; 455/436; 455/562.1; 370/331

(58) Field of Classification Search .................. 455/436, 455/439, 422.1, 562.1, 550.1, 67.11, 69; 370/330, 331, 328; 375/347, 349, 148

See application file for complete search history.

(56) References Cited

U.S. PATENT DOCUMENTS

| 6,842,632 | B2 * | 1/2005 | Raghothaman et al. | ... 455/562.1 |
| 6,879,831 | B2 * | 4/2005 | Hamabe | ........................ 455/442 |
| 6,892,059 | B1 * | 5/2005 | Kim et al. | ...................... 455/272 |
| 7,133,682 | B2 * | 11/2006 | Seki et al. | ...................... 455/450 |
| 2009/0042571 | A1 * | 2/2009 | Ishii et al. | ...................... 455/436 |

* cited by examiner

*Primary Examiner* — Cong Tran (57) ABSTRACT

Wireless communication method and system for improving optimal antenna weight derivation in transmit diversity mode during soft handover. The method and system use scale factors that depend on the reliability of the feedback information (FBI) detection on the uplink. Depending on FBI detections for each link, the scale factors are then applied to the downlink channel response estimates. FBI detection performance may be based on downlink antenna verification, downlink transmit power control command "up/down" ratio, or both. Poor antenna verification or a high number of "power up" commands on the uplink may indicate unreliable FBI detection. By applying higher scale factors to downlink channel responses corresponding to reliable FBI detection better closed transmit diversity performance during soft handovers may be achieved. This Abstract is submitted with the understanding that it will not be used to interpret or limit the scope or meaning of the claims. 37 CFR 1.72(b).

8 Claims, 5 Drawing Sheets

DERIVATION OF OPTIMAL ANTENNA WEIGHTS DURING SOFT HANDOVER

CROSS REFERENCE TO RELATED APPLICATIONS

This application claims the benefit of U.S. Provisional Application No. 60/618.331, filed Oct. 13, 2004 and is a continuation of U.S. application Ser. No. 10/950,732, filed Sep. 27, 2004, now U.S. Pat. No. 7,319,868, the disclosures of which are fully incorporated herein by reference.

FIELD OF THE INVENTION

The present invention relates generally to the application of transmission diversity in wireless communication and, more particularly, to a method and system for improving the derivation of optimal antenna weights in closed-loop mode transmit diversity.

BACKGROUND OF THE INVENTION

In wireless communication, the effect of multipath fading can be lessened by employing diversity techniques. One such technique is antenna diversity where multiple antennas are used at the mobile terminal to receive several independently fading signals from the base station. Another technique, called transmit diversity, involves time-shifting the signal at the base station, then transmitting it to the mobile terminal on multiple antennas. The time-shifted versions of the signal create frequency selective fading that may then be equalized at the receiver to provide the diversity gain.

Transmit diversity is used in most modern wireless communication systems, including 3GPP (3rd Generation Partnership Project), which is a WCDMA (wideband code division multiple access) based system. In WCDMA base stations, four modes of operations are specified: (1) no transmit diversity, (2) open loop transmit diversity, (3) closed loop transmit diversity mode 1, and (4) closed loop transmit diversity mode 2. The first mode of operation, of course, involves no transmit diversity. The second mode of operation is typically used when the mobile terminal is moving very rapidly. The third and fourth modes of operation are typically used when the mobile terminal is moving more slowly. These modes of operation are generally known in the art and will not be described in detail here (see, e.g., 3GPP Specification TS 25.214 V5.8.0 (2004-03)).

In the closed loop transmit diversity modes, the channel condition is transmitted from the mobile terminal on the uplink to the base station in the form of feedback information (FBI). The FBI may then be used to adjust the phase and amplitude (i.e., beam-forming) of the dedicated physical channel (DPCH) transmitted to the mobile terminal on the downlink. By using beam-forming, improved performance in terms of lower downlink code power for the same Quality of Service (QoS) may be achieved. This is especially true for low Doppler frequencies when the vehicular velocity of the mobile terminal is low. As a result, the downlink capacity may also be improved as compared to the open loop transmit diversity mode of operation.

Complications may arise, however, when closed loop transmit diversity is used in soft handover situations, primarily because the mobile terminal can receive signals from more than one base station in such soft handovers. WCDMA systems rely on strict power control to maintain signal quality such that the link between the mobile terminal and the base station typically uses only enough power to achieve the required QoS and no more. Moreover, WCDMA power control is designed such that only one uplink will meet the required QoS at any given moment. Thus, the quality of the link between the mobile terminal and the other base stations involved in the soft handover will be much worse. Consequently, detection of the FBI on the uplink in these other base stations may be erroneous, resulting in erroneous antenna adjustments on the downlink.

SUMMARY OF THE INVENTION

The present invention is directed to a method and system for improving optimal antenna weight derivation in transmit diversity mode during soft handover. The method and system of the invention uses scale factors that depend on the reliability of the FBI detection on the uplink. The scale factors are then applied to the downlink channel response estimates for the corresponding FBI detections. In some embodiments, FBI detection performance is based on downlink antenna verification, downlink transmit power control command "up/down" ratio, or both. Poor antenna verification or a high number of "power up" commands on the downlink may indicate unreliable FBI detection. By applying higher scale factors to downlink channel responses corresponding to reliable FBI detection, better closed transmit diversity performance during soft handovers may be achieved.

In general, in one aspect, the invention is directed to a method in a mobile terminal of a wireless communication system for estimating optimal antenna weights for use during a soft handover between base stations using closed loop transmit diversity. The method comprises estimating antenna weights for a downlink of each base station involved in the soft handover, the antenna weights estimated based on channel responses of the downlinks. The method further comprises estimating a reliability of feedback information detection at each base station, and obtaining scale factors for the channel responses, the scale factors determined based on the reliability of the feedback information detection at each base station. The scale factors are then applied to the channel responses, and optimal antenna weights are calculated based on the channel responses having the scale factors applied thereto. The optimal antenna weights are then sent as feedback information on uplinks for all base stations involved in the soft handover.

In general, in another aspect, the invention is directed to a receiver for a mobile terminal in a wireless communication system that is capable of estimating optimal antenna weights for use during a soft handover between base stations using closed loop transmit diversity. The method comprises an antenna verification unit configured to estimate downlink antenna weights for each base station involved in the soft handover, the estimated antenna weights based on a channel response of each of the downlinks. The mobile terminal further comprises a control unit adapted to determine a reliability of the feedback information detection at each of the base stations and to obtain scale factors based on the reliability of the feedback information detection. An antenna weight optimization unit is configured to apply the scale factors to the channel responses and to calculate optimal antenna weights based on the channel responses having the scale factors applied thereto. Also present is a feedback information unit adapted to send the optimal antenna weights as feedback information on uplinks for all base stations involved in the soft handover.

In general, in yet another aspect the invention is directed to a method in a mobile terminal of a wireless communication system, of informing a plurality of base stations to adjust their antenna weights based on feedback information detection errors at the base stations. The method comprises determining a reliability of feedback information detection at the plurality of base stations, and adjusting antenna weights to be communicated to the base stations based on the reliability of the feedback information detection. The method further comprises sending the antenna weights as feedback information to the base stations.

In general, in still another aspect, the invention is directed to a mobile terminal of a wireless communication system that is configured to inform a plurality of base stations to adjust their antenna weights based on feedback information detection errors at the base stations. The mobile terminal comprises means for determining a reliability of feedback information detection at the plurality of base stations, and means for adjusting antenna weights to be communicated to the base stations based on the reliability of the feedback information detection. The mobile terminal further comprises means for sending the antenna weights as feedback information to the base stations.

It should be emphasized that the term comprises/comprising, when used in this specification, is taken to specify the presence of stated features, integers, steps, or components, but does not preclude the presence or addition of one or more other features, integers, steps, components, or groups thereof.

BRIEF DESCRIPTION OF THE DRAWINGS

The foregoing and other advantages of the invention will become apparent from the following detailed description and upon reference to the drawings, wherein.

DESCRIPTION OF ILLUSTRATIVE
EMBODIMENTS OF THE INVENTION

As mentioned above, embodiments of the invention provide a system and method of implementing transmit diversity. Although embodiments of the invention are described with respect to soft handovers in a WCDMA system, those of ordinary skill in the art will recognize that the principles and teachings herein are equally applicable to other wireless communication systems and operational modes.

Figure 1A:
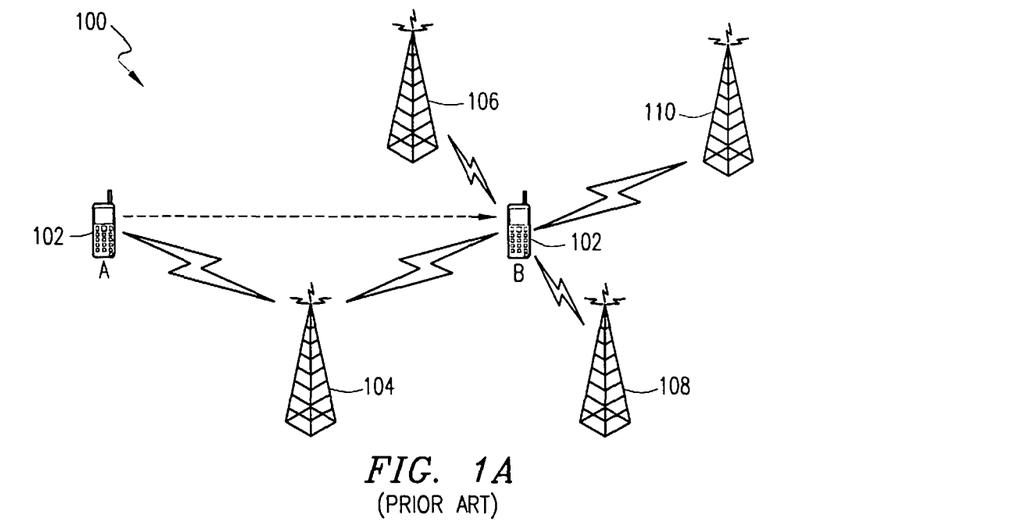
FIGS. 1A-1B illustrate a prior art system for implementing transmit diversity.

FIG. 1A shows a portion of an exemplary wireless communication system 100. The wireless communication system 100 includes a plurality of mobile terminals, one of which is indicated at 102. Also present are several WCDMA base stations, four of which are shown here at 104, 106, 108, and 110. When the mobile terminal 102 is at location A, it can only receive signals from the first base station 104 and is therefore linked to that base station 104. However, when the mobile terminal moves to location B, it can receive signals from several additional base stations, including base stations 106, 108, and 110. The mobile terminal 102 must then determine which base station 104, 106, 108, and 110 has the strongest signal and switch to that base station. Such a process is commonly called a soft handover and refers to situations where the mobile terminal 102 is able to receive signals from multiple base stations simultaneously.

Figure 1B:
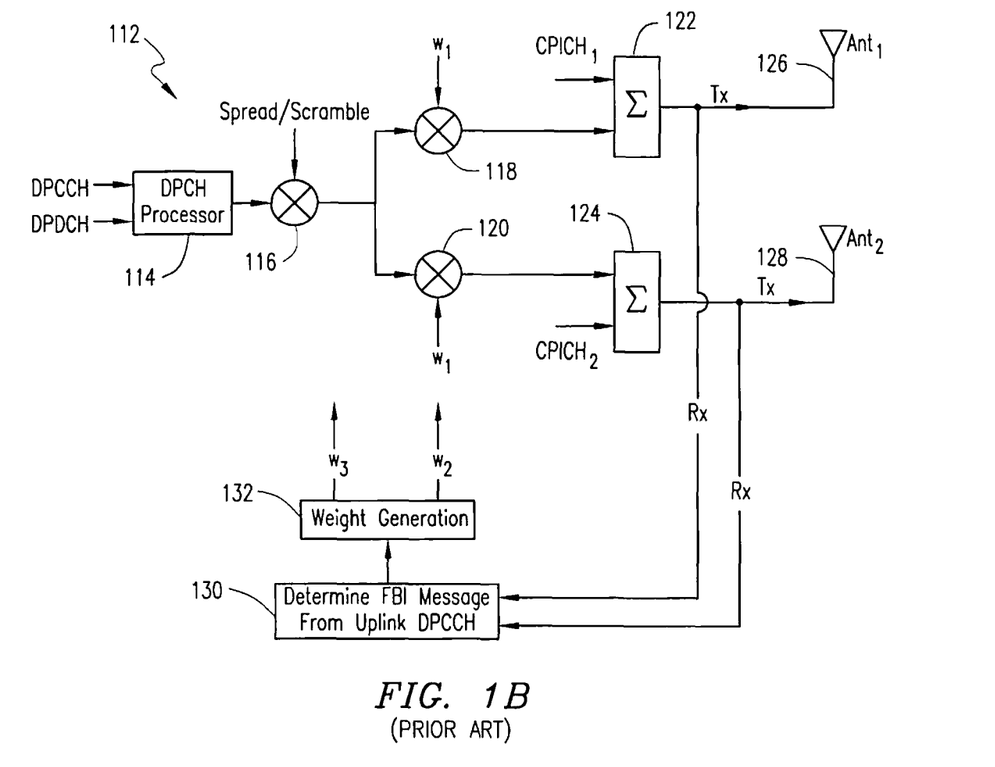

FIG. 1B shows a downlink transmitter 112 for supporting closed loop transmit diversity typically found in WCDMA base stations, such as the base stations 104, 106, 108, and 110. The transmitter 112 includes a dedicated physical channel (DPCH) processor 114 for receiving (e.g., from the base station controller, not shown) and processing a dedicated physical control channel (DPCCH) and a dedicated physical data channel (DPDCH). Depending on whether the base station is using closed loop transmit diversity mode 1 or mode 2, the same DPCCH pilot symbols or orthogonal versions of the DPCCH pilot symbols may be used. In either case, the DPCH signal from the dedicated physical channel processor 114 is fed to a spreading mixer 116 where it is mixed with a spread/scramble signal for encoding. The encoded DPCH signal is then provided to weight factor mixers 118 and 120 where weight factors $\bar{\omega}_1$ and $\bar{\omega}_2$ are applied to the DPCH signal. The weighted DPCH signals are thereafter combined with the common pilot channels ($CPICH_1$ and $CPICH_2$) and other channels via summing nodes 122 and 124 and transmitted on the downlink via antennas 126 and 128.

According to 3GPP, the weight factors $\bar{\omega}_1$ and $\bar{\omega}_2$ are determined by the mobile terminal and provided to the base station as FBI via the uplink DPCH. An FBI determination processor 130 thereafter determines the FBI from the uplink DPCH and forwards the FBI to a weight factor processor 132. The weight factor processor 132 generates the weight factors $\bar{\omega}_1$ and $\bar{\omega}_2$ (which translate into the corresponding phase adjustments for closed loop mode 1 and the phase/amplitude adjustments for closed loop mode 2) based on the FBI received from the mobile terminal. In essence, the mobile terminal instructs the base station on the weight factors $\bar{\omega}_1$ and $\bar{\omega}_2$ to maximize the power P, as follows:

$$P = \omega^H H^H H \omega \qquad (1)$$

where $$\omega = \begin{pmatrix} \bar{\omega}_1 \\ \bar{\omega}_2 \end{pmatrix},$$

$H=(h_1 h_2)$, and $h_1$ represents the estimated channel responses obtained using the common pilot channel CPICH for antennas 126 and 128. The weights are then quantized based on the transmit diversity mode and mapped on the uplink FBI. Weight optimization and FBI derivation for the case of a single downlink is well-known in the air.

Often, channel response estimates from a common pilot channel (CPICH) are used in the matched filtering process of the dedicated physical channel processor 114, since they are less noisy than channel response estimates from the dedicated physical channel DPCH due to the high transmission power for the common pilot channel CPICH. However, as alluded to above, in closed loop transmit diversity, the antenna settings for the common pilot channel CPICH and the dedicated physical channel DPCH differ with respect to the weight factors $\bar{\omega}_1$ and $\bar{\omega}_2$. But since the weight factors $\bar{\omega}_1$ and $\bar{\omega}_2$ depend on the earlier transmitted FBI, if the FBI detection is erroneous, the subsequently generated weight factors $\bar{\omega}_1$ and $\bar{\omega}_2$ may also be erroneous. To overcome this problem, the mobile terminals in 3GGP use information on the common pilot channel CPICH and the dedicated physical channel DPCH in conjunction with the transmitted FBI to estimate the transmitted antenna weights $\bar{\omega}_1$ and $\bar{\omega}_2$. This process is also known as "antenna verification" and is well-understood in the art.

Complications arise, however, when antenna verification in closed loop transmit diversity is used with soft handovers (where the mobile terminal may communicate with multiple base stations simultaneously). In soft handovers, the process for deriving the antenna weights is essentially the same as described above, except the maximized power P is expressed as:

$$P = \omega^H (H_1^H H_1 + \ldots + H_N^H H_N) \omega \quad (2)$$

where $H_i$ is the downlink channel response for the $i^{th}$ base station. Thus, the transmit diversity mode in the soft handover case appears very similar to the transmit diversity mode in the case of a single base station with multiple paths.

But WCDMA systems rely on strict power control to maintain signal quality such that the uplink between the mobile terminal and the base station typically uses no more power than necessary to achieve the required QoS. And the WCDMA power control is designed such that only one base station will meet the required QoS at any given moment. Thus, the quality of the uplink between the mobile terminal and the other base stations involved in the soft handover is often much worse. For example, it has been observed in field trials that the uplink from the mobile terminal to some of the base stations may be temporarily out of synchronization in a soft handover. This poor uplink quality means that the FBI may be difficult to determine at the base station, which in turn means that antenna weights in the downlink for the mobile terminal may be incorrect.

Furthermore, fading in the uplink and the downlink is independent of one another, which may result in the downlink for a particular base station only appearing to have high quality. The perceived high quality may cause the antenna weights for that base station to have a larger impact than the other base stations, yet the downlink for that base station may in actuality be almost out of synchronization. Thus, it is possible to end up with a very large FBI error ratio between the single base station case and the soft handover case (e.g., 30-40% error in the soft handover case versus 3-6% in the single base station case). The large error ratio may negate any performance gain that was achieved by using closed loop transmit diversity to begin with in soft handovers.

The above complications may be mitigated by applying a set of scale factors of $\alpha_i$ to the downlink channel response estimates, as follows:

$$P = \omega^H (\alpha_1 H_1^H H_1 + \ldots + \alpha_N H_N^H H_N) \omega \quad (3)$$

The scale factors $\alpha_i$ help compensate for poor or unreliable FBI detection on the uplink by increasing the impact of base stations that have higher reliability FBI detections, resulting in higher quality links overall. However, the mobile terminal cannot directly ascertain the reliability of the FBI detections, since that is done at the base station. Therefore, in accordance with embodiments of the invention, the mobile terminal obtains an estimate of the reliability of the FBI detection. In one embodiment, the mobile terminal performs antenna verification on the downlink for each base station involved in the soft handover. The antenna verification indicates whether a particular base station is applying the appropriate weight factors $\bar{\omega}_1$ and $\bar{\omega}_2$ to the antennas of the base station.

Alternatively, the mobile terminal examines the power control "up/down" ratio on the downlink for each base station. For example, a high number of "power up" commands for a particular base station indicates poor quality on the uplink to that base station, hence a high probability of poor FBI detection. Either of the above methods is sufficiently reliable to be used by itself, but they may also be combined to provide even more accuracy of the FBI detection performance estimates. Following is a more detailed description of the system and method of the invention.

Figure 2:
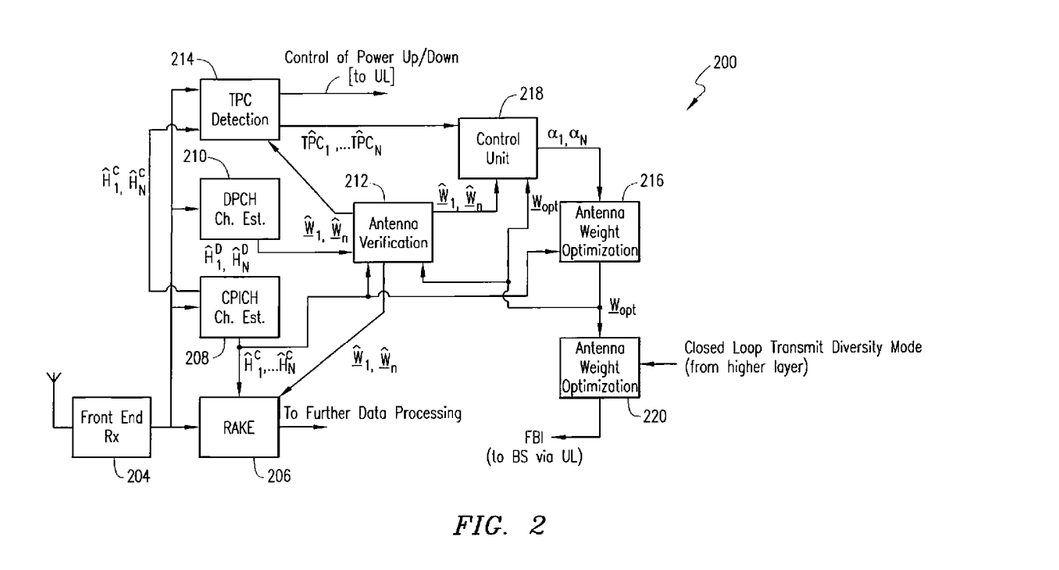
FIG. 2 illustrates a block diagram of a system for implementing transmit diversity according to embodiments of the invention.

Referring to FIG. 2, a block diagram of the receiver portion 200 of a mobile terminal capable of operating in closed loop transmit diversity mode according to embodiments of the invention is shown. Whether the mobile terminal operates in closed loop transmit diversity mode depends on instructions received from the higher layers (not shown) in the mobile terminal. The higher layers also instruct the mobile terminal whether to perform a soft handover. These aspects of mobile terminal operation are well-known and are therefore not discussed here. In this example, it is assumed that the mobile terminal is operating in both the closed loop transmit diversity mode and is also performing a soft handover.

A composite signal that includes all the signals from the base stations (BS) involved in the soft handover, as well as any noise that may be present, is received through the receiver antenna 202 and down-converted to a baseband signal in the front end receiver 204. This baseband signal is then fed to a RAKE receiver 206 and thereafter to channel estimators 208 and 210, where the channel filter taps are estimated using the common pilot channel CPICH and the dedicated physical channel DPCH pilots. The downlink response estimates $\hat{H}_1^c$, $\hat{H}_N^c$ (for CPICH) and $\hat{H}_1^d, \hat{H}_N^d$ (for DPCH) of each base station may then be obtained and used for data detection.

Because the mobile terminal is operating in closed loop transmit diversity mode, the dedicated physical channel DPCH response estimates $\hat{H}_1^d, \hat{H}_N^d$ will be phase-shifted relative to the common pilot channel CPICH response estimates $\hat{H}_1^c, \hat{H}_N^c$ (by virtue of the weight factors $\bar{\omega}_1$ and $\bar{\omega}_2$. The two channel response estimates $\hat{H}_1^c, \hat{H}_N^c$ and $\hat{H}_1^d, \hat{H}_N^d$ are then fed to an antenna verification unit of 212 for estimation of the antenna weight factors, $\hat{\omega}_1, \hat{\omega}_n$, to verify the channel response estimates. The antenna verification unit 212 determines the amount of phase shift, using the two channel response estimates $\hat{H}_1^c, \hat{H}_N^c$ and $\hat{H}_1^d, \hat{H}_N^d$ plus the optimal antenna weights $\omega_{opt}$ obtained in the previous time slots to provide an estimate of the antenna weight factors $\hat{\omega}_1, \hat{\omega}_n$, for all downlinks. Based on the foregoing, the antenna weights ideally may be expressed as:

$$\hat{\omega}_i(t) = \omega_{opt}(t-1), \forall i \quad (4)$$

where $\omega_{opt}(t-1)$ is the optimal antenna weights derived in the previous time slots and $\hat{\omega}_i$ is the actual antenna weights used by the base station for the $i^{th}$ downlink in the current slot.

However, Equation (4) does not always hold due to non-ideal FBI detection at the base station and also to quantization of the optimal antenna weights, $\omega_{opt}$, depending on the particular closed loop transmit diversity mode. Therefore, estimates of the actual antenna weights are normally obtained for verification purposes at the mobile terminal via the antenna verification unit 212. The result of the antenna verification unit 212, $\hat{\omega}_1, \hat{\omega}_n$, as well as the common pilot channel CPICH response estimates $\hat{H}_1^c, \hat{H}_N^c$, are fed to the RAKE receiver 206 for data detection. This same information is also fed to the transmit power control (TPC) detection unit 214 for decoding the power command (PC) information. The above is well-known to persons of ordinary skill in the wireless communication art and is therefore only described briefly here.

In accordance with embodiments of the invention, the common pilot channel CPICH response estimates $\hat{H}_1^c, \hat{H}_N^c$ are also provided to an antenna weight optimization unit 216 that estimates the optimal antenna weights $\omega_{opt}$ for each time slot.

A control unit 218 then uses the optimal antenna weights $\omega_{opt}$ for the previous time slot along with the estimates of the antenna weights, $\hat{\omega}_1, \hat{\omega}_n$, from the antenna verification unit 212 to determine the scale factors $\alpha_1, \alpha_N$ per downlink, for all downlinks. The antenna weight optimization unit 216 then estimates the optimal antenna weights $\omega_{opt}$ for the current time slot using the scale factors $\alpha_1, \alpha_N$. Based on the foregoing, the optimal antenna weights $\omega_{opt}$ may be expressed as:

$$\omega_{opt} = \max_{\omega} P \quad (5)$$

where P is defined by Equation (3) above. The optimal antenna weights $\omega_{opt}$ is then provided to an FBI bits processor 220, which sends the FBI bits to the base station (BS) on the uplink.

As mentioned above, during soft handover, some of the uplinks may have bad FBI detection performance at the base station due to the design of the WCDMA power control. Therefore, scaling the downlink according to the uplink FBI detection performance may achieve some gain in the average downlink code power used by the mobile terminal. In general, the scale factors $\alpha_i$ may be calculated as a function of the uplink FBI detection performance:

$$\alpha_i = f(\text{estimated uplink FBI detection performance for } i^{th} \text{ uplink}) \quad (6)$$

In one exemplary embodiment, the scale factors $\alpha_i$ may be determined by calculating the probability of an FBI detection error in the uplink (UL):

$$p_{FBI \text{ error } UL_i} = \frac{\text{number of incorrect antenna weights for link } i \text{ in last } n \text{ slots}}{n} \quad (7)$$

where n may be 50-200 time slots. The incorrect antenna weight may be determined using any suitable technique known to those of ordinary skill in the art. For example, in 3GPP Specification TS 25.214 V5.8.0 (2004-03), a number of phase states are defined for the antenna weights. An incorrect antenna weight results when there is a difference in states for the antenna weights estimated in the current time slot compared to the optimal antenna weight specified by the mobile terminal in the previous time slot.

The probability may also be implemented as a first order IIR-filter, with a time constant of approximately 50-200 time slots. In that case, the $p_{FBI}$ error may be expressed as follows:

$$p_{FBI \text{ error in } UL_i}(t) = \lambda I_{FBI \text{ error in } UL_i}(t) + (1-\lambda) p_{FBI \text{ error in } UL_i}(t-1) \quad (8)$$

where the indicator function $$I_{FBI \text{ error in } UL_i} = \begin{cases} 1 & \text{error found} \\ 0 & \text{otherwise} \end{cases}$$

and $\lambda = 0.005 - 0.02$ (which corresponds to 200 and 50 time slots, respectively).

The $p_{FBI}$ errors may then be mapped to the scale factors $\alpha_i$, which may be derived in advanced based on, for instance, laboratory test results. A look-up table may then be used to store the $p_{FBI}$ errors and the corresponding scale factors $\alpha_i$ in the mobile terminal. An exemplary set of scale factors $\alpha_i$ is provided below for illustrative purposes:

$$\alpha_i = \begin{cases} 1 & \text{if } p_{FBI} \text{ error } UL_i < 0.1 \\ 0.5 & \text{if } 0.1 \leq p_{FBI} \text{ error } UL_i < 0.25 \\ 0.1 & \text{if } p_{FBI} \text{ error } UL_i \geq 0.25 \end{cases} \quad (9)$$

The scale factors $\alpha_i$ and $p_{FBI}$ errors shown here are based on observations that uplinks with good QoS have approximately 5% FBI, while unreliable uplinks with bad channel quality have FBI errors well above 25%.

Alternatively, in some embodiments, the control unit 218 may also use the results of the transmit power control detection unit 214, $\hat{TPC}_1, \hat{TPC}_N$, along with the estimates of the antenna weights, $\hat{\omega}_1, \hat{\omega}_n$, from the antenna verification unit 212 to determine the scale factors $\alpha_i$. In these embodiments, the control unit 218 first determines the ratio $R_i$ of power up commands over power down commands for the $i^{th}$ link over the last n time slots, where n may again be, for example, 50-200 time slots. The ratio $R_i$ may also be an average of the number of power up commands over the number of power down commands, or it may be the highest/lowest ratio over a predefined time period. After the particular form of the ratio $R_i$ is decided, in one embodiment, a baseline scale factor may be established based on, for example, the smallest ratio $R_{min}$ calculated using the most stringent QoS of the various uplinks, for example, $\alpha_i = 1$. Other scale factors may then be set up according to the baseline scale factor, for example:

$$\alpha_i = \begin{cases} 0.5 & \text{if } R_i > 3R_{min} \\ 0.1 & \text{if } R_i > 10R_{min} \end{cases} \quad (10)$$

The values in Equation (10), which may also be stored in a lookup table (or a graph) in the mobile terminal, are based on the observation that uplinks with good QoS generally have less than 60% power up commands during soft handovers, while uplinks with bad channel conditions usually have close to 100% power up commands.

It should be noted that the above groupings related to Equations (8)-(10) are provided as illustrations only, and that fewer or any greater number of groupings may certainly be used without departing from the scope of the invention. As a general rule, the greater the FBI detection error, the lower the scale factors $\alpha_i$.

In some embodiments, it is also possible for the control unit 218 to use a combination of the above scale factor determining techniques to determine the scale factors $\alpha_i$.

Figure 3:
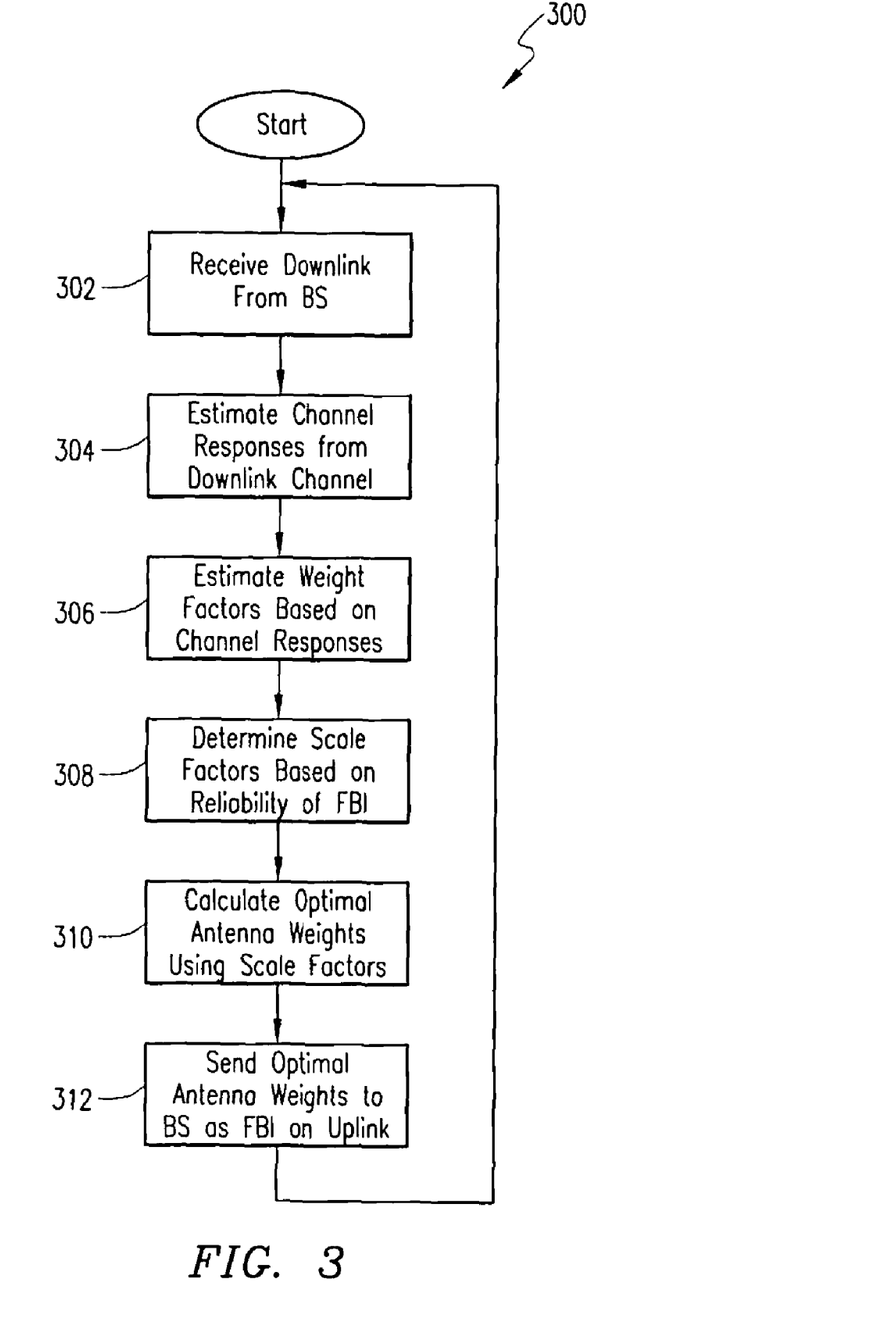
FIG. 3 illustrates a flow diagram of a method for implementing transmit diversity according to embodiments of the invention.

FIG. 3 illustrates a flow chart 300 for a general method that may be used to implement closed loop transmit diversity, either mode 1 or 2, in a mobile terminal during soft handover according to embodiments of the invention. The method begins at step 302, where the mobile terminal receives the common pilot channel CPICH and the dedicated physical channel DPCH on the downlink from a base station involved in a soft handover. At step 304, the mobile terminal estimates the channel responses from the common pilot channel CPICH and the dedicated physical channel DPCH. The mobile terminal thereafter uses the estimated channel responses at step 306, along with the optimal antenna weights calculated in the previous time slot, to verify whether the antenna weights applied to the channels by the base station matches the optimal antenna weights from the previous time slot. At step 308, the mobile terminal determines a set of scale factors based on the estimated weight factors and based on whether those weight factors indicate reliable FBI detection at the base station (from step 306). The mobile terminal then calculates a set of optimal antenna weights for the current time slot from the scale factors (and also the channel responses from the common pilot channel CPICH) at step 310. At step 312, the mobile terminal sends the optimal antenna weights to the base station on the up link in the form of FBI.

Figure 4:
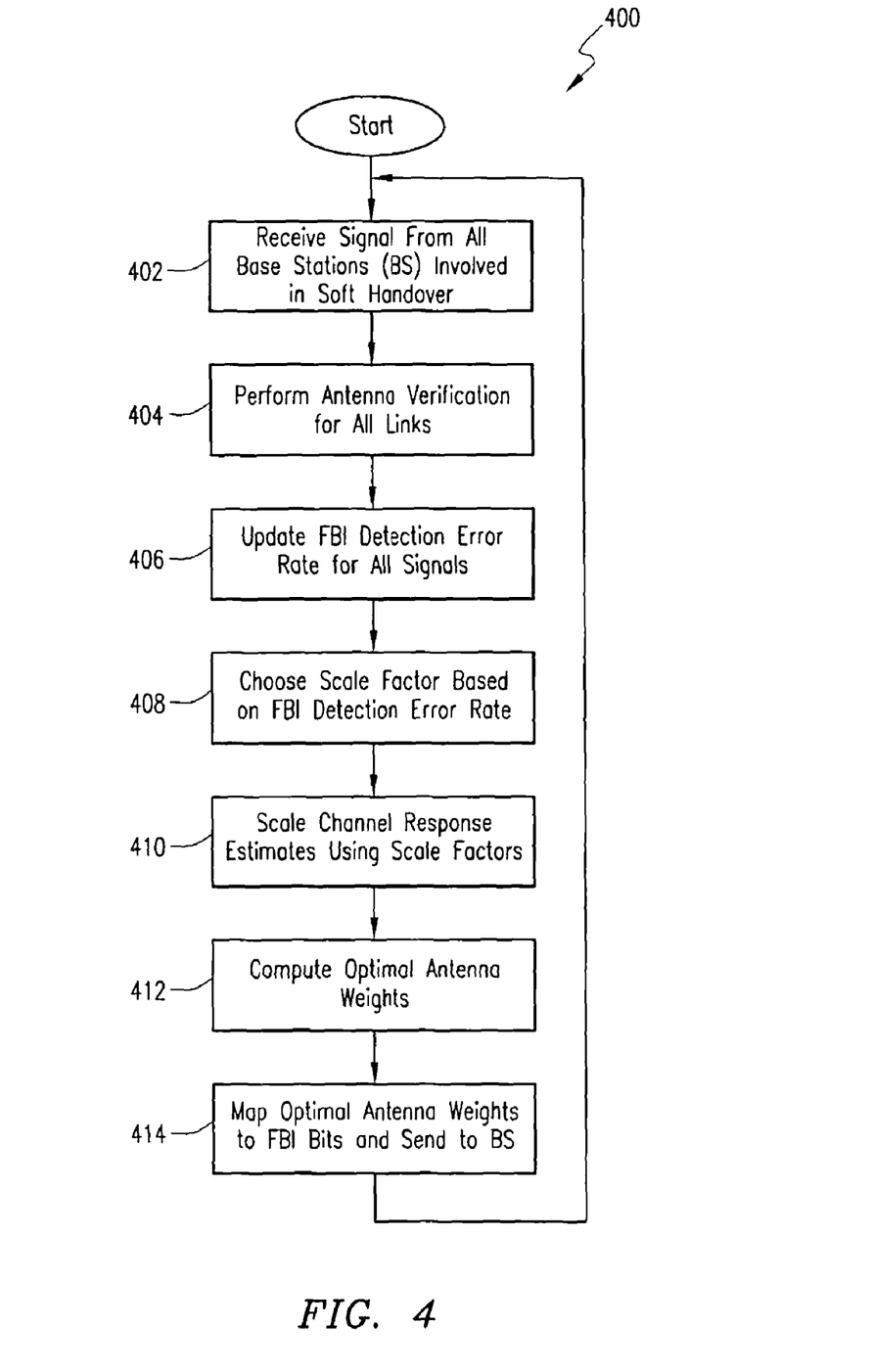
FIG. 4 illustrates a flow diagram of another method for implementing transmit diversity according to embodiments of the invention.

A flow chart 400 for a more specific method that may be used to implement closed loop transmit diversity, either mode 1 or 2, in a mobile terminal during soft handover according to embodiments of the invention is shown in FIG. 4. The method begins at step 402, where the mobile terminal receives a signal from all the base stations involved in the soft handover (i.e., the active set). The mobile terminal thereafter performs antenna verification in the manner described above for the links of the involved base stations at step 404. At step 406, the mobile terminal updates the FBI detection error rate $p_{FBI\ error\ UL_i}$ for all the links using the antenna verifications. Scale factors $\alpha_i$ are then chosen by the mobile terminal based on the FBI detection error rate $p_{FBI}$ error $UL_i$ at step 408. At step 410, the mobile terminal scales the channel response estimates $\hat{H}_1^c, \hat{H}_N^c$ using the scale factors $\alpha_i$. The mobile terminal then uses the scaled channel response estimates $\hat{H}_1^c$, $\hat{H}_N^c$ to determine the optimal antenna weights $\omega_{opt}$ at step 412. The optimal antenna weights $\omega_{opt}$ are then mapped to the FBI bit and sent to the base stations at step 414.

Figure 5:
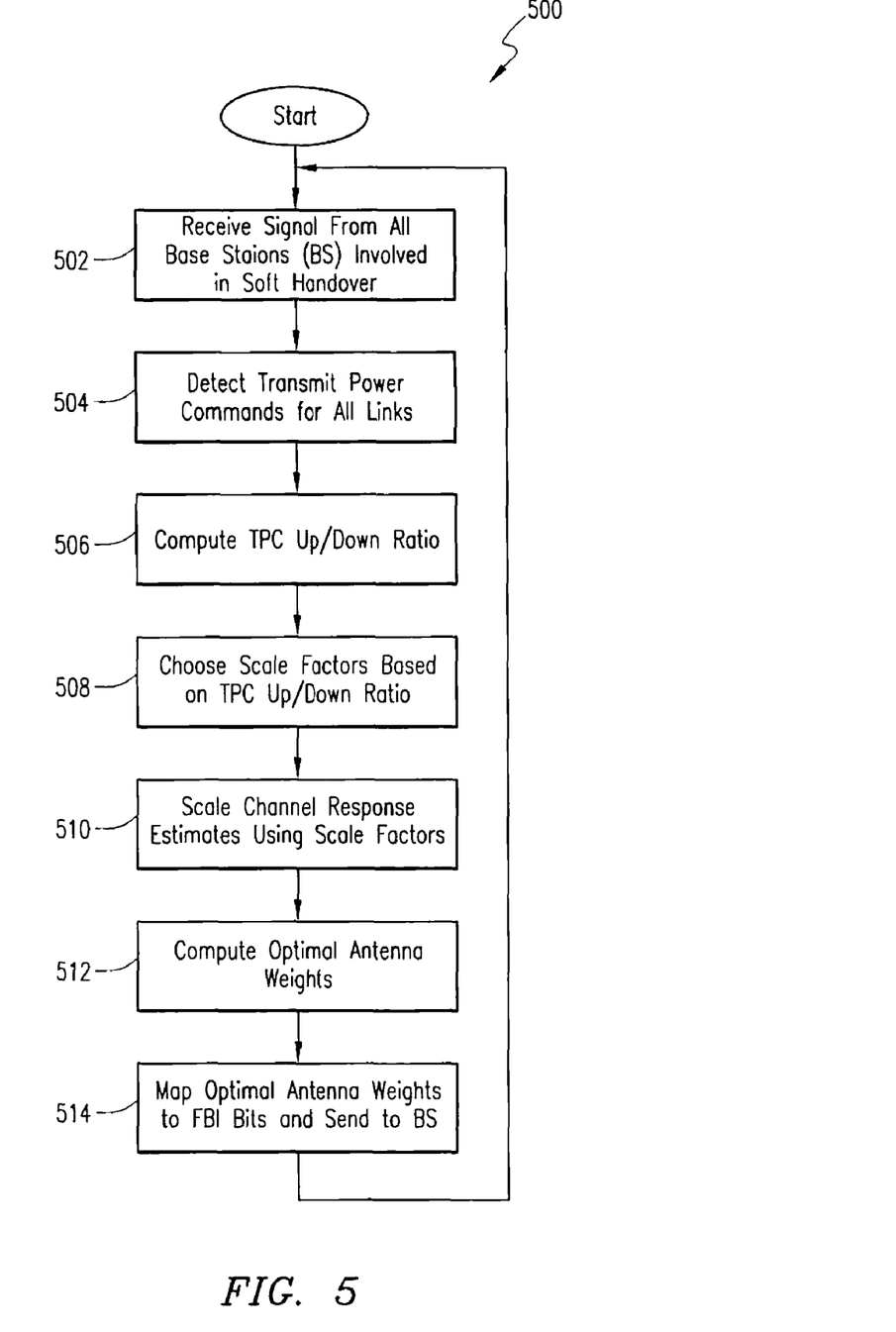
FIG. 5 illustrates a flow diagram of yet another method for implementing transmit diversity according to embodiments of the invention.

FIG. 5 illustrates a flow chart 500 for another more specific method that may be used to implement closed loop transmit diversity, either mode 1 or 2, in a mobile terminal during soft handover according to embodiments of the invention. The flow chart 500 is otherwise similar to the flow chart 400 of FIG. 4 except for the second step 502, third step 504, and fourth step 506. In step 502, instead of performing antenna verification, the mobile terminal detects the transmit power commands for the links of all involved mobile stations (i.e., the active set). The mobile terminal thereafter computes the Up/Down ratio $R_i$ of the transmit power commands for each link at step 504. Based on these ratios $R_i$, the mobile terminal chooses the appropriate scale factors $\alpha_i$ at step 506.

While the present invention has been described with reference to one or more particular embodiments, those skilled in the art will recognize that many changes may be made thereto without departing from the spirit and scope of the present invention. For example, although the methods illustrated in FIGS. 4 and 5 were shown and described separately, in some embodiments, it is possible to combine the inventive aspects of these two methods into a single method. Therefore, each of the foregoing embodiments and obvious variations thereof is contemplated as falling within the spirit and scope of the claimed invention, which is set forth in the following claims.

What is claimed is:

1. A method in a mobile terminal of a wireless communication system for estimating antenna weights for use during a soft handover between base stations using closed loop transmit diversity, comprising the steps of:
   estimating a reliability of feedback information detection at each base station;
   obtaining scale factors for channel responses of downlinks from each base station, said scale factors determined based on said reliability of said feedback information detection at each base station;
   applying said scale factors to said channel responses;
   calculating antenna weights based on said channel responses having said scale factors applied thereto; and
   sending said antenna weights as feedback information on uplinks to all base stations involved in said soft handover.

2. A method in a mobile terminal of a wireless communication system for use during a soft handover between base stations using closed loop transmit diversity, comprising the steps of:
   receiving, by a mobile terminal, a common pilot channel (CPICH) and a dedicated physical channel (DPCH) on the downlink from a base station involved in a soft handover;
   calculating, by the mobile terminal, optimal antenna weights;
   estimating, by the mobile terminal, the channel responses from the CPICH and the DPCH;
   using, by the mobile terminal, the estimated channel responses, and the optimal antenna weights calculated in a previous time slot, to verify whether the antenna weights applied to the channels by the base station match the optimal antenna weights from the previous time slot;
   determining, by the mobile terminal, a set of scale factors based on estimated weight factors and based on whether those weight factors indicate reliable feedback information at the base station;
   calculating, by the mobile terminal, a set of optimal antenna weights for the current time slot from the scale factors and the channel responses from the CPICH; and
   sending, by the mobile terminal, the optimal antenna weights to the base station on the up link in the form of feedback information.

3. A method to implement closed loop transmit diversity in a mobile terminal, comprising the steps of:
   receiving, by a mobile terminal, a signal from a plurality of an active set of base stations involved in a soft handover;
   performing, by the mobile terminal, antenna verification;
   updating, by the mobile terminal, a feedback information detection error rate for all the links using the antenna verifications;
   choosing, by the mobile terminal, scale factors, based on a feedback information detection error rate;
   scaling, by the mobile terminal, channel response estimates using the scale factors;
   using, by the mobile terminal, the scaled channel response estimates to determine the optimal antenna weights;
   mapping the optimal antenna weights to the feedback information; and
   sending to the feedback information to the plurality of base stations.

4. A method to implement closed loop transmit diversity in a mobile terminal; comprising the steps of:
   receiving, by a mobile terminal, a signal from a plurality of an active set of base stations involved in a soft handover;
   detecting the transmit power commands for the links of a plurality of active base stations;
   computing, by the mobile terminal, an Up/Down ratio of the transmit power commands for each link;
   choosing, by the mobile terminal, based on the Up/Down ratio, appropriate scale factors;
   scaling, by the mobile terminal, channel response estimates using the scale factors;
   using, by the mobile terminal, the scaled channel response estimates to determine the optimal antenna weights;
   mapping the optimal antenna weights to the feedback information; and
   sending to the feedback information to the plurality of base stations.

5. A mobile terminal of a wireless communication system adapted to estimate antenna weights for use during a soft handover between base stations using closed loop transmit diversity, comprising:
- means for estimating a reliability of feedback information detection at each base station;
- means for obtaining scale factors for channel responses of downlinks from each base station, said scale factors determined based on said reliability of said feedback information detection at each base station;
- means for applying said scale factors to said channel responses;
- means for calculating antenna weights based on said channel responses having said scale factors applied thereto; and
- means sending said antenna weights as feedback information on uplinks to all base stations involved in said soft handover.

6. A mobile terminal of a wireless communication system for use during a soft handover between base stations using closed loop transmit diversity, comprising:
- means for receiving a common pilot channel (CPICH) and a dedicated physical channel (DPCH) on the downlink from a base station involved in a soft handover;
- means for calculating optimal antenna weights;
- means for estimating the channel responses from the CPICH and the DPCH;
- means for using the estimated channel responses, and the optimal antenna weights calculated in a previous time slot, to verify whether the antenna weights applied to the channels by the base station match the optimal antenna weights from the previous time slot;
- means for determining a set of scale factors based on estimated weight factors and based on whether those weight factors indicate reliable feedback information at the base station;
- means for calculating a set of optimal antenna weights for the current time slot from the scale factors and the channel responses from the CPICH; and
- means for sending the optimal antenna weights to the base station on the uplink in the form of feedback information.

7. A mobile terminal for use in a wireless system, comprising:
- means for receiving, by a mobile terminal, a signal from a plurality of an active set of base stations involved in a soft handover;
- means for performing antenna verification;
- means for updating a feedback information detection error rate for all the links using the antenna verifications;
- means for choosing scale factors, based on a feedback information detection error rate;
- means for scaling channel response estimates using the scale factors;
- means for determining the optimal antenna weights using the scaled channel response estimates;
- means for mapping the optimal antenna weights to the feedback information; and
- means for sending to the feedback information to the plurality of base stations.

8. A mobile terminal, comprising:
- means for receiving a signal from a plurality of base stations involved in a soft handover;
- means for detecting the transmit power commands for the links of a plurality of involved base stations;
- means for computing an Up/Down ratio of the transmit power commands for each link;
- means for choosing, based on the Up/Down ratio, appropriate scale factors;
- means for scaling channel response estimates using the scale factors;
- means for using the scaled channel response estimates to determine the optimal antenna weights;
- means for mapping the optimal antenna weights to the feedback information; and
- means for sending to the feedback information to the plurality of base stations.

* * * * *